(12) United States Patent
Rosenthal

(10) Patent No.: US 10,563,408 B2
(45) Date of Patent: *Feb. 18, 2020

(54) DRYWALL JOINT TAPE AND METHOD

(71) Applicant: United States Gypsum Company, Chicago, IL (US)

(72) Inventor: Guy Rosenthal, Wheaton, IL (US)

(73) Assignee: UNITED STATES GYPSUM COMPANY, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/466,736

(22) Filed: Aug. 22, 2014

(65) Prior Publication Data
US 2015/0089893 A1 Apr. 2, 2015

Related U.S. Application Data

(60) Provisional application No. 61/885,881, filed on Oct. 2, 2013.

(51) Int. Cl.
E04F 13/04 (2006.01)
B32B 37/14 (2006.01)
E04F 21/165 (2006.01)

(52) U.S. Cl.
CPC ............ *E04F 13/042* (2013.01); *B32B 37/14* (2013.01); *E04F 21/1657* (2013.01); *Y10T 156/10* (2015.01); *Y10T 442/30* (2015.04)

(58) Field of Classification Search
CPC ..... E04F 13/042; E04F 21/1657; B32B 37/14
See application file for complete search history.

(56) References Cited

U.S. PATENT DOCUMENTS

| 2,314,523 A | | 3/1943 | Speer | |
|---|---|---|---|---|
| 2,814,080 A | | 11/1957 | Tvorik et al. | |
| 2,850,404 A | * | 9/1958 | Dunlap | E04F 13/04 156/304.3 |
| 3,391,037 A | | 7/1968 | McNulty | |
| 4,640,864 A | * | 2/1987 | Porter | B32B 5/18 428/334 |

(Continued)

FOREIGN PATENT DOCUMENTS

| CN | 2832989 Y | 11/2006 |
|---|---|---|
| CN | 201080690 Y | 7/2008 |

(Continued)

OTHER PUBLICATIONS

Russian Search Report from corresponding Russian Patent Application No. 2016114045, dated Apr. 18, 2018.

(Continued)

*Primary Examiner* — Robert Canfield
(74) *Attorney, Agent, or Firm* — Greer, Burns & Crain, Ltd.; Pradip Sahu; Philip T. Petti

(57) ABSTRACT

A joint tape for drywall includes a substrate layer having an elongate shape in a lengthwise direction and being flexible in the lengthwise direction and in a transverse direction. The tape further includes a covering layer disposed in bonding relation on the substrate layer. The covering layer is rigid in the transverse direction and configured to withstand compressive forces applied generally in the transverse direction and shear stresses applied generally along the transverse direction.

16 Claims, 4 Drawing Sheets

(56) References Cited

U.S. PATENT DOCUMENTS

| | | | |
|---|---|---|---|
| 4,792,473 A | 12/1988 | Vitale | |
| 5,017,312 A * | 5/1991 | Peters et al. | 264/438 |
| 5,246,775 A | 9/1993 | Loscuito | |
| 5,333,433 A * | 8/1994 | Porambo et al. | 52/417 |
| 5,486,394 A * | 1/1996 | Stough | 428/61 |
| 5,687,523 A * | 11/1997 | Stough | B32B 29/02 |
| | | | 428/110 |
| 5,763,043 A * | 6/1998 | Porter | D03D 9/00 |
| | | | 428/109 |
| 5,891,282 A | 4/1999 | Stough et al. | 156/71 |
| 6,054,205 A * | 4/2000 | Newman et al. | 428/221 |
| 6,136,731 A | 10/2000 | Ōhashi | |
| 6,263,629 B1 * | 7/2001 | Brown, Jr. | E04C 2/044 |
| | | | 442/179 |
| 6,524,980 B1 * | 2/2003 | Fensel | B32B 5/26 |
| | | | 428/110 |
| 7,049,251 B2 * | 5/2006 | Porter | B28B 19/0092 |
| | | | 428/911 |
| 7,354,876 B2 * | 4/2008 | Porter | B32B 5/02 |
| | | | 139/426 TW |
| 7,594,963 B2 | 9/2009 | Bonetto et al. | |
| 7,625,827 B2 * | 12/2009 | Egan | D03D 1/00 |
| | | | 442/20 |
| 7,786,026 B2 * | 8/2010 | Newton | B29C 70/22 |
| | | | 442/164 |
| 7,846,278 B2 * | 12/2010 | Porter | B32B 5/26 |
| | | | 156/39 |
| 7,902,092 B2 * | 3/2011 | Egan | D03D 1/00 |
| | | | 442/2 |
| 8,166,719 B2 * | 5/2012 | Helton | 52/408 |
| 8,298,967 B2 * | 10/2012 | Egan | D03D 1/00 |
| | | | 428/292.4 |
| RE44,070 E * | 3/2013 | Yu | C04B 28/14 |
| | | | 428/156 |
| 8,795,808 B2 * | 8/2014 | Spanton | E04F 13/042 |
| | | | 428/112 |
| 8,828,537 B2 * | 9/2014 | Newton | C09J 7/21 |
| | | | 428/343 |
| 10,280,338 B2 | 5/2019 | Mayo | |
| 2003/0181114 A1 * | 9/2003 | Newton et al. | 442/149 |
| 2005/0009428 A1 | 1/2005 | Porter et al. | |
| 2005/0136758 A1 * | 6/2005 | Newton | B29C 70/22 |
| | | | 442/43 |
| 2005/0144901 A1 * | 7/2005 | Egan | D03D 1/00 |
| | | | 52/782.1 |
| 2006/0124490 A1 * | 6/2006 | Dufresne | B65D 33/2508 |
| | | | 206/410 |
| 2006/0191237 A1 * | 8/2006 | Hansen | 52/746.1 |
| 2006/0207202 A1 * | 9/2006 | Newton et al. | 52/255 |
| 2008/0034694 A1 * | 2/2008 | Banta | 52/417 |
| 2008/0128070 A1 * | 6/2008 | Goldman | 156/71 |
| 2008/0176469 A1 * | 7/2008 | Dong et al. | 442/58 |
| 2009/0239430 A1 * | 9/2009 | Egan | D03D 1/00 |
| | | | 442/46 |
| 2010/0071292 A1 * | 3/2010 | Futterman | 52/412 |
| 2010/0092725 A1 * | 4/2010 | Goldman | 428/137 |
| 2010/0266835 A1 * | 10/2010 | Conboy | D04H 1/4218 |
| | | | 428/306.6 |
| 2011/0033693 A1 | 2/2011 | Little, Jr. | |
| 2011/0065345 A1 * | 3/2011 | Phillips | B32B 13/08 |
| | | | 442/34 |
| 2011/0143616 A1 * | 6/2011 | Egan | D03D 1/00 |
| | | | 442/20 |
| 2012/0027975 A1 * | 2/2012 | LaVelle | 428/40.1 |
| 2012/0148806 A1 * | 6/2012 | Dubey | B28B 19/0092 |
| | | | 428/193 |
| 2013/0042557 A1 * | 2/2013 | Egan | D03D 1/00 |
| | | | 52/343 |
| 2013/0045351 A1 * | 2/2013 | Spanton | C09J 7/045 |
| | | | 428/61 |
| 2014/0023833 A1 * | 1/2014 | Futterman | 428/190 |
| 2014/0087612 A1 * | 3/2014 | Hart | C09D 7/1233 |
| | | | 442/1 |
| 2015/0007519 A1 * | 1/2015 | Negri et al. | 52/417 |
| 2015/0089893 A1 * | 4/2015 | Rosenthal | B32B 37/14 |
| | | | 52/417 |
| 2015/0204077 A1 * | 7/2015 | Mikulecky | D03D 15/0011 |
| | | | 156/71 |
| 2015/0330081 A1 * | 11/2015 | Vido | B32B 27/12 |
| | | | 442/38 |
| 2017/0081562 A1 * | 3/2017 | Rosenthal | C09J 5/04 |
| 2017/0305113 A1 * | 10/2017 | Sproule, III | B32B 9/005 |
| 2018/0155897 A1 * | 6/2018 | Little, Jr. | D03D 3/005 |
| 2019/0136542 A1 * | 5/2019 | Rosenthal | B32B 37/14 |

FOREIGN PATENT DOCUMENTS

| | | | | |
|---|---|---|---|---|
| EP | 0567109 A1 | 10/1993 | | |
| FR | 2123259 A1 | 9/1972 | | |
| FR | 2514806 A1 | 4/1983 | | |
| GB | 580999 A | 3/1945 | | |
| RU | 118660 U1 | 7/2012 | | |
| WO | 95/30810 A1 | 11/1995 | | |
| WO | WO 2015050799 A1 * | 4/2015 | | E04F 13/042 |

OTHER PUBLICATIONS

Taiwanese Office Action from corresponding TW Application No. 103133625, dated Apr. 18, 2018.

Japanese Office Action from corresponding Japanese Patent Application No. 2016-518437, dated Sep. 20, 2018.

Ukrainian Notice of Allowance from corresponding Ukrainian Patent Application No. a201603992, dated Jun. 18, 2019.

* cited by examiner

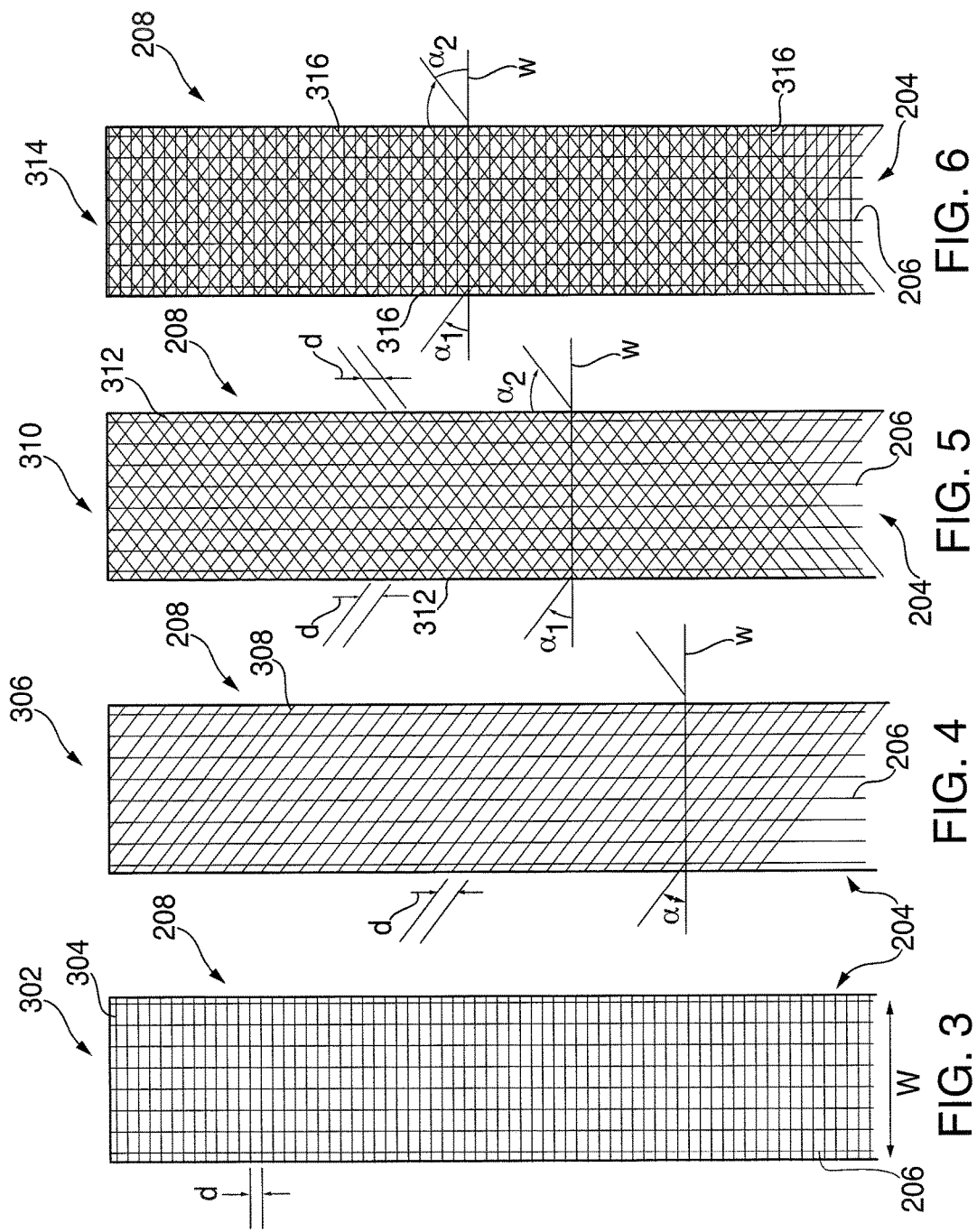

DRYWALL JOINT TAPE AND METHOD

CROSS-REFERENCE TO RELATED APPLICATIONS

The instant application claims the benefit of the filing date of U.S. Provisional Application No. 61/885,881, filed on Oct. 2, 2013, the contents of which are hereby incorporated herein in their entirety by this reference.

BACKGROUND

Typical load bearing or separation wall assemblies in buildings are made of support structures, for example, wooden or metal studs, covered by wallboards. There are many different types of wallboard for use depending on the requirements of various applications. One wallboard type that is most commonly used to build internal walls in buildings is gypsum wallboard, which is conventionally attached to studs. Gypsum wallboards are available in various standard sizes having predetermined width, for example, 4 ft., and predetermined lengths such as 8 ft., 10 ft., or other sizes. In conventional installations, wallboards are assembled end-to-end and/or side-to-side to cover wall surfaces greater than the length or width of the drywall sheets, which requires joints along edges of wallboard sheets to be created.

Typical wallboard joints are constructed by a combination of a joint compound and a matrix material to create a composite structure lending strength to the joint. Similar processes are also used to make wallboard repairs and/or finish inside and outside wall corners. One matrix material commonly used for wallboard joints is a rolled material, commonly referred to as "tape." When constructing a joint, a layer of joint compound may be laid along a joint before a layer of tape is added along and covering the joint. One or more layer of joint compound may be added over the tape, and over each other, as is known. The resulting layers of dried joint compound and tape make up a composite joint structure that should be able to withstand various stresses such as tensile, compressive and shear stresses that may be present at the joint, such that cracks and breaks are avoided as wall structures may shift, settle or otherwise become stressed. However, this is not the case. Although composite joint structures are generally effective in withstanding tensile stresses, i.e., stresses tending to pull the joint apart, they are not sufficiently resilient against compressive or shear stresses tending to compress or slide the joint.

There are two conventional types of tape used in the art today. The first type, made of paper, includes a continuous or perforated tape strip that offers little to no strength in the compressive direction. The second type, made of fiberglass, is also weak in a compressive stress direction. In general, fiberglass tape is not ideal for stabilizing joints between drywall boards because, while it has cross-directional fibers (short fibers whose length is the width of the tape) that are strong in tension and provide excellent resistance to tensile forces pulling the joint apart, it provides almost no resistance to compressive forces that push the boards closer together. Numerous drywall joint strength tests have shown that fiberglass mesh tape makes a joint relatively strong when tensile forces are placed on the joint, but when compressive or shearing forces are placed on the joint, it fails easily. Joint failure manifests itself as joint compound cracking, which requires repair. For this reason, fiberglass joint tape is not recommended for use with drying type joint compounds, which are not as strong and crack-resistant as setting-type compounds.

Samples of a drywall joint made with Fibatape® tape have been tensile tested in accordance with ASTM C 474 (Appendix) which measures the strength to first crack of a tape-compound sample coated in electrically conductive paint. The strength is measured until the first crack in the paint occurs, which breaks the electrical continuity along the surface and registers the ultimate tensile load. Such failures suggest that typical taped joints do not optimize the strength of the glass-joint compound composite. In one mode of failure, tensile loads tend to separate the glass fibers from the joint compound matrix instead of transferring these loads to the glass fibers themselves.

SUMMARY

In one aspect, the disclosure describes joint tape for drywall applications. The joint tape includes a substrate layer having an elongate shape in a lengthwise direction and being flexible in the lengthwise direction and in a transverse direction. The tape further includes a covering layer disposed in bonding relation on the substrate layer. The covering layer is rigid in the transverse direction and configured to withstand compressive forces applied generally in the transverse direction and shear stresses applied generally along the transverse direction.

In another aspect, the disclosure describes a drywall joint between two adjacent drywall panels. The joint includes a layer of joint compound disposed along generally abutting edges of the two adjacent drywall panels, and a joint tape embedded within the layer of joint compound. The joint tape includes a substrate layer having an elongate shape in a lengthwise direction along the generally abutting edges. The substrate layer is flexible in the lengthwise direction and in a transverse direction, which is perpendicular to the lengthwise direction. The joint tape further includes a covering layer disposed in bonding relation on the substrate layer. The covering layer is rigid in the transverse direction and configured to withstand compressive forces applied generally in the transverse direction tending to push the two adjacent drywall panels towards each other, and shear stresses applied generally along the transverse direction tending to slide the two drywall panels relative to one another along the abutting edges thereof.

In yet another aspect, the disclosure describes a method for manufacturing joint tape for use in drywall joints. The method includes providing a substrate layer that is flexible in a lengthwise direction and in a transverse direction. The method further includes providing a covering layer that is flexible in the lengthwise direction but is rigid in the transverse direction. When manufacturing the joint tape, the substrate and covering layers are deposited in overlapping relation to create a joint tape preform. The substrate layer is then bonded to the covering layer in the joint tape preform to create a joint tape that is flexible in the lengthwise direction but rigid in the transverse direction.

BRIEF DESCRIPTION OF THE DRAWINGS

FIGS. 3-6 illustrate various embodiments of joint tape in accordance with the disclosure.

DETAILED DESCRIPTION

The present disclosure is applicable to drywall or other wallboard joints and, more particularly, to a joint tape for use in composite joint structures including the tape embedded into one or more type of joint compound. Various embodiments are described herein relative to joint tape for drywall, but it should be appreciated that the structures and methods relative to making or using joint tape are applicable to other types of wall panels as well.

Figure 1:
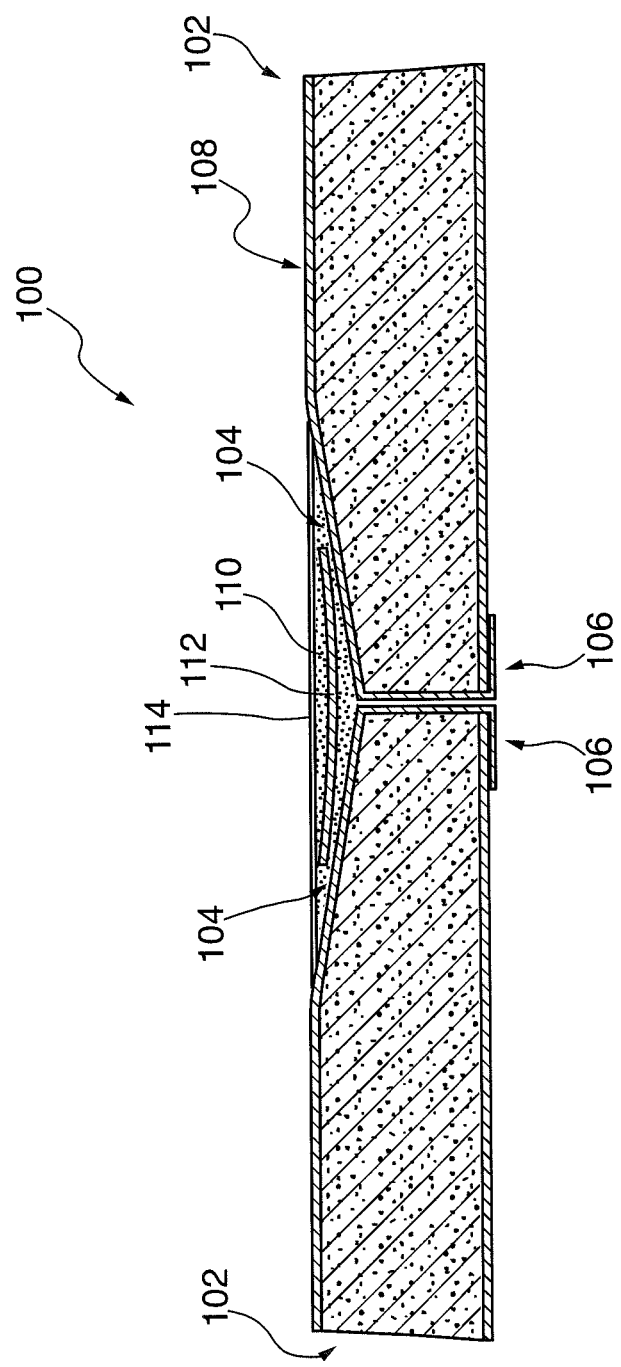
FIG. 1 illustrates a cross section of a wall board joint in accordance with the disclosure.

A cross section of a drywall joint 100 is shown in FIG. 1. The drywall joint 100, as shown, is a composite joint formed between two drywall panels 102. Each panel forms a recessed section 104 along a joint edge 106 to accommodate the materials making up the joint 100 such that a flat surface is presented on an external drywall surface 108. The joint 100 is referred to herein as a "composite" joint, which means that the joint structure is made of the combination of different materials. For example, the joint 100 in the illustrated embodiment includes overlapping layers of hardened joint compound 110, a joint tape 112 embedded within the hardened joint compound 110, and an optional skim-coat compound layer 114, which is formable to a fine finish surface made to match the external drywall surface 108. Advantageously, the hardened joint compound 110 may be a drying type joint compound that, when embedding the tape 112, forms a structure having superior resistance to compressive and shear stresses that was previously achieved. The tape 112, although shown embedded in the joint compound, may alternatively include a layer of adhesive affixing it directly onto the drywall before deposition of the joint compound. As is known, joints between various wall panels may be assembled in stages, which include material deposition, forming and sanding between each application. In the illustrated embodiment, the joint tape 112 is advantageously configured to withstand shear, tensile and compressive stresses applied between the two wall panels 102.

Figure 2:
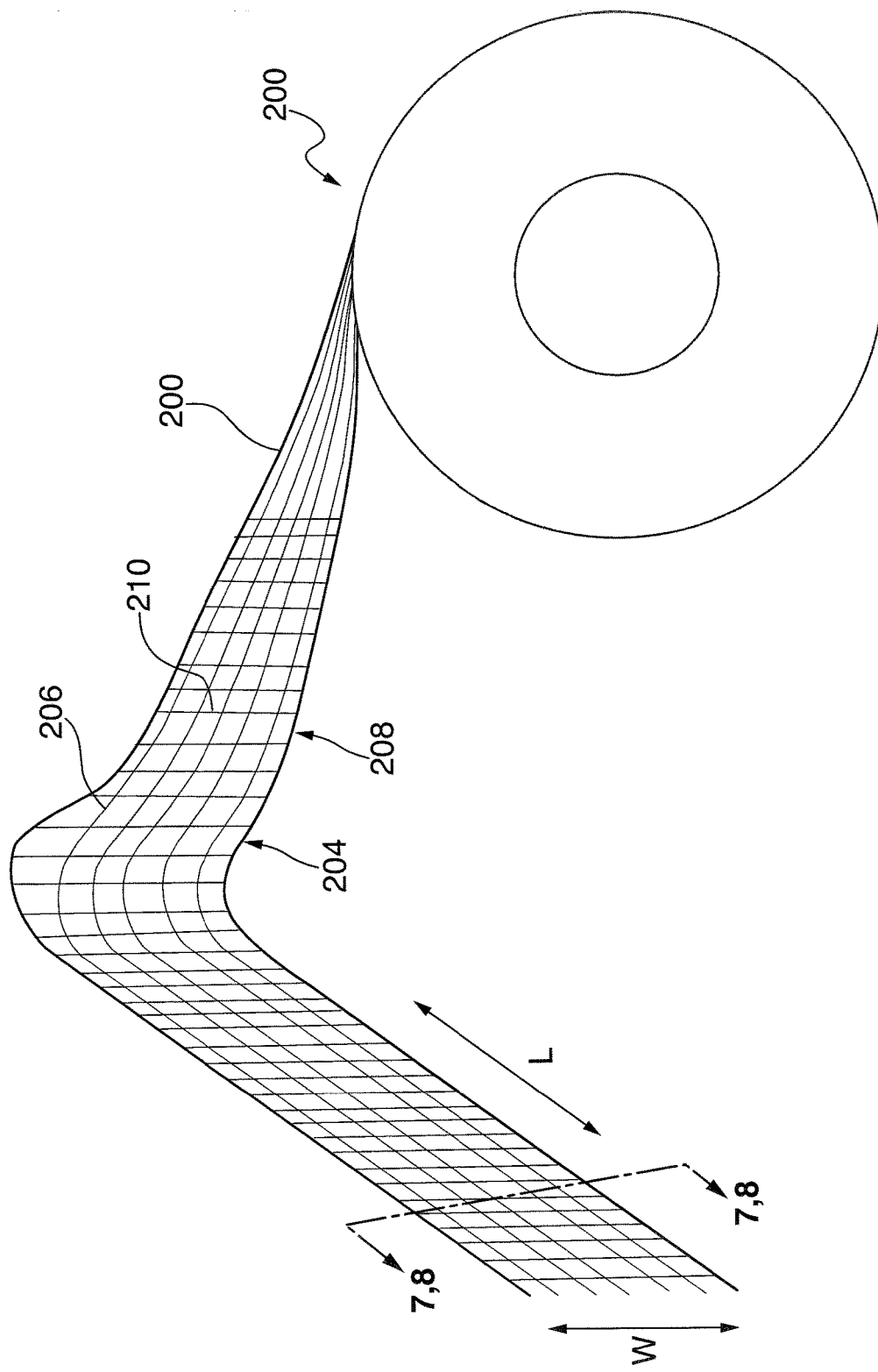
FIG. 2 illustrates a roll of joint tape in accordance with the disclosure.

A roll of joint tape 200 is shown in FIG. 2 to illustrate various structural and/or functional aspects thereof. The roll 200 may be made up of the same or a similar type of joint tape 112, as shown and described in FIG. 1. The roll of joint tape 200 is advantageously configured for dispensing appropriate lengths of tape 202 during assembly of drywall joints. As can be seen in FIG. 2, the tape 202 is made of two layers—a substrate layer 204 and a covering layer 208. As used herein, "layer" denotes a plurality or group of fibers that share similar traits including but not limited to a similar composition, size, function, and/or deposition pattern, but not necessarily a particular positioning in the tape structure. Therefore, while the two separate substrate and covering layers are described and shown in accordance with a handful of embodiments for joint tape, it is contemplated that the various fibers that make up these layers can be woven together. In other words, while the layers are shown and described separately in certain embodiments, the substrate and covering layers may be woven together in a single fabric.

In the illustrated embodiment, the substrate layer 204 forms the substrate of the tape 202, has a generally elongate shape extending along a major axis of the tape 202, and forms the material layer of the tape 202 that permits the rolling of the tape 202 into the roll 200, provides flexibility for application and handling of the tape 202, and the like. In one embodiment, the substrate layer 204 may include an adhesive permitting its installation directly onto the drywall panels around a joint before the tape is embedded with joint compound. The substrate layer 204 may be made of any appropriate material having good flexing and strength properties permitting the formation of the tape 202 in to the roll 200. Materials considered appropriate for forming the substrate layer 204 include reinforced plastic, glass, fabric or metal, each of which is formed into strings, threads or fibers 206 that are woven or otherwise structured into an elongate shape. Depending on the material used to make them, the fibers of the substrate layer 204 have sufficient flexibility to allow handling, application and rolling of the tape because these fibers will extend in a lengthwise direction relative to a seam between wall panels (along edges 106, as shown in FIG. 1) and are, thus, not expected to withstand considerable stresses after formation of the joint 100.

The covering layer 208 of the tape 202 forms the portion of the joint structure 100 (FIG. 1) that provides superior resistance to compressive and shear stresses than previously proposed tape designs. In the illustrated embodiment, the covering layer 208 is made from a plurality of transversely extending fibers 210, which possesses rigidity along their respective axial direction such that, the entire tape assembly can resist compressive and shear stresses. For clarity, the lengthwise direction of the tape is along the tape's rolling direction, which is illustrated with the designation "L" in FIG. 2, and the transverse direction is the direction perpendicular to the lengthwise direction, which is illustrated with the designation "W" in FIG. 2.

In the tape 202, the cross-fibers 210 in the covering layer 208 are made of metal, glass, plastic or another suitable material that can be formed into fibers and that possesses resistance to buckling under compressive or shear stresses when integrated into a matrix of settable cementitious material such as set drywall joining compound. In one contemplated embodiment, the fibers making up the substrate layer 204 have different mechanical properties than the fibers making up the covering layer 208 so that each layer can be tailored or configured to account for flexibility (substrate layer) and rigidity (covering layer). In one embodiment, the fibers in the covering and substrate layers 204 and 208 are woven together such that the tape is made up of a single fabric layer. In other words, the tape 202 is advantageously flexible in the lengthwise direction, which allows the tape to be handled, installed and packaged, and rigid in the crosswise or transverse direction, which enables to the joint 100 to withstand compressive and shear loading.

The desired difference in mechanical properties between the substrate and covering layers 204 and 208 can be accomplished by different methods. In one embodiment, the fibers between the two different layers may be made of different materials, for example, flexible fabric or glass mat for the substrate layer 204 and rigid plastic for the covering layer 208. Alternatively, the fibers may be made of the same material, for example, glass, plastic or metal, but have different gauges or cross-sectional sizes, with thinner, more flexible fibers making up the substrate layer and thicker, more rigid fibers, making up the covering layer. Moreover, the pattern of fiber arrangement in either layer can also help increase resistance to shear and compressive stresses.

Four different embodiments for the arrangement of fibers at least in the covering layer for the tape 202 are shown in FIGS. 3-6. In these embodiments, the bottom end of the tape is shown partially unraveled for illustration, and the substrate layer 204 is shown made up of the fibers 206 extending parallel to one another for simplicity. It should be appreciated that in the tape embodiments shown in FIGS. 3-6, the fibers of the various substrate and covering layers are woven together into a single fabric, which is shown from a top view for simplicity. In a first tape embodiment 302, shown in FIG. 3, the covering layer 208 is made of fibers 304 that extend parallel to one another in the transverse direction W. The covering layer fibers 304 are disposed at a spacing, d, from one another, which is selected based on the fiber width and the fiber material empirically to provide optimum compressive performance when embedded in a set cementitious joint compound material.

In a second tape embodiment 306, shown in FIG. 4, the covering layer 208 is made of fibers 308 that extend at an angle, $\alpha$, with respect to the transverse direction W. In the illustrated embodiment, the angle $\alpha$ is about 60°, but other angles may be used. The based on the fiber width and the fiber material empirically to provide optimum compressive performance when embedded in a set cementitious joint compound material.

In a third tape embodiment 310, shown in FIG. 5, the covering layer 208 is made of two different layers of fibers 312 arranged in a crisscross configuration as shown. Specifically, a first network of fibers 312 includes fibers that extend parallel to one another at a first angle, $\alpha 1$, and a second network of fibers 312 includes fibers that extend parallel to one another at a second angle, $\alpha 2$. To maintain symmetry and to permit installation of the tape in either direction, in the illustrated embodiment, $\alpha 1 = 180° - \alpha 2$. As shown, $\alpha 1$ is equal to about 60°, and $\alpha 2$ is equal to about 120°. In each of the first and second networks of fibers, the fibers 312 are disposed at a spacing, d, from one another, which is selected based on the fiber width and the fiber material empirically to provide optimum compressive performance when embedded in a set cementitious joint compound material. As compared to the tape 306, the tape 310 may be better equipped to handle shear and compressive stresses owing to the increased covering layer fiber density, and to the angled disposition of the covering layer fibers in two directions, which can withstand non-transversely applied compressive stresses.

In a fourth tape embodiment 314, shown in FIG. 6, the covering layer 208 is made of three different layers of fibers 312 arranged in a crisscross and in a transverse configuration as shown. Specifically, a first network of fibers 316 includes fibers that extend parallel to one another at a first angle, $\alpha 1$, a second network of fibers 316 includes fibers that extend parallel to one another at a second angle, $\alpha 2$, and a third network of fibers 316 includes fibers that extend parallel to the transverse direction W. To maintain symmetry and to permit installation of the tape in either direction, in the illustrated embodiment, $\alpha 1 = 180° - \alpha 2$. As shown, $\alpha 1$ is equal to about 60°, $\alpha 2$ is equal to about 120°, and the third network of fibers is parallel to the transverse direction W, or, at an angle of 0°. In each of the first, second and third networks of fibers, the fibers 316 are disposed at a spacing, d, from one another, which is selected based on the fiber width and the fiber material empirically to provide optimum compressive performance when embedded in a set cementitious joint compound material. As compared to the tape 310, the tape 314 may be better equipped to handle shear and compressive stresses owing to the increased covering layer fiber density, to the angled disposition of the covering layer fibers in two directions, and to the additional fiber layer, which can together withstand transversely and non-transversely applied compressive stresses.

Figure 7:
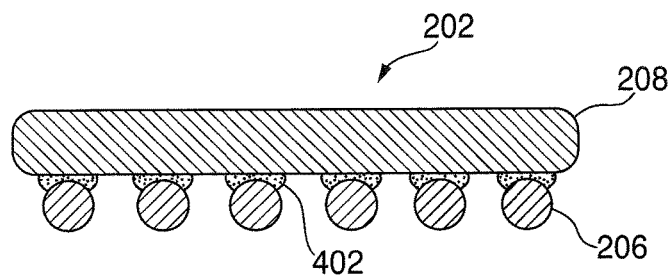
FIG. 7 illustrates a cross section of one embodiment for a joint tape in accordance with the disclosure.

To augment the rigidity of the tape 202, in certain embodiments, an adhesive structure or operation may be added to bond the substrate and covering layers to one another so that a more rigid tape structure can be created. Two possible embodiments are shown in the cross sections of FIGS. 7 and 8. In these figures, where like reference numerals are used to denote similar structures as previously described for simplicity, cross sections are taken from one exemplary tape embodiment, here, the tape 202 shown in FIG. 2. In each section, the substrate layer fibers 206 are shown at the bottom of the illustration, and the covering layer fibers 210 are shown, in cross section, at the top of the illustration.

Figure 8:
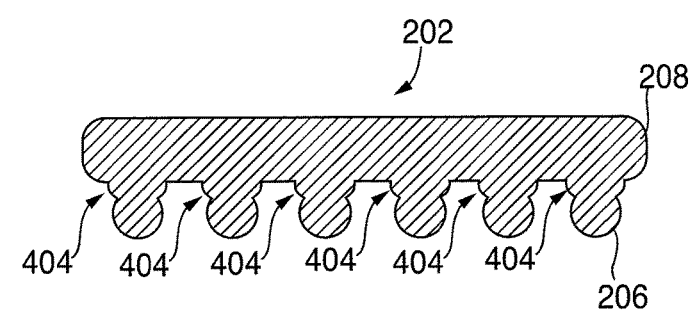
FIG. 8 illustrates an alternative embodiment for a joint tape in accordance with the disclosure.

In the first illustration, an adhesive 402 is added at every or, at least, at a majority of intersections between substrate and covering fibers. The adhesive 402 bonds the two fibers to each other and is made from a very rigid material, for example, settable epoxy, that prevents the covering layer fibers from flexing at least locally, thus increasing the overall rigidity of the tape 202. In the second illustration, as shown in FIG. 8, the adhesive 402 is omitted in favor of a welding operation performed to fuse the substrate fibers to the covering layer fibers at the points of intersection 404 between the two fiber arrangements. Such fusing or welding may be accomplished by different methods and on different materials. For example, in embodiments where both the substrate and the covering layer fibers are made of plastic, the fusing operation between the fibers at each intersection 404 may be accomplished by heating the tape to locally melt the fiber material so it can fuse, by ultrasonic welding operation, by exposure of the materials to a solvent, and by other appropriate methods.

Figure 9:
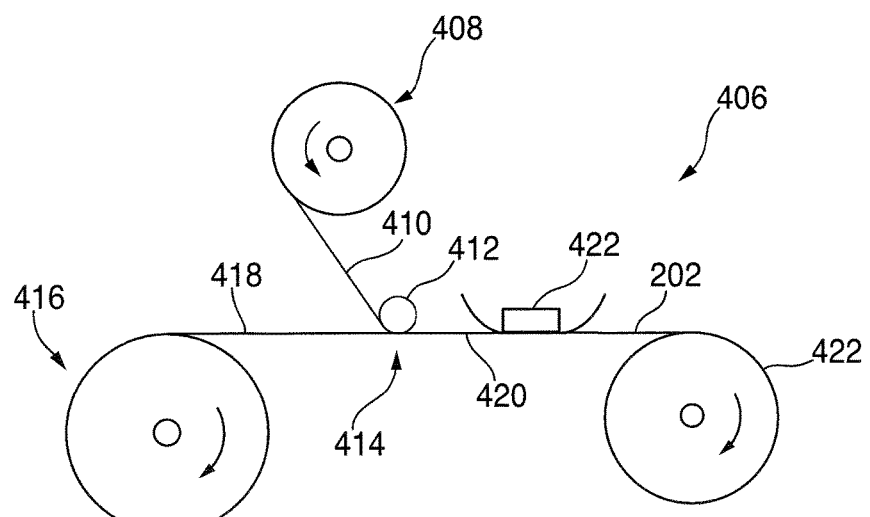
FIG. 9 illustrates a manufacturing method for a joint tape in accordance with the disclosure.

A block diagram schematically illustrating a joint tape manufacturing process 406 in accordance with the disclosure is shown in FIG. 9. In the illustrated embodiment, a first feed roll 408 containing a substrate layer preform 410 supplies the preform via auxiliary rollers 412 to a layering station 414. Simultaneously, a second feed roll 416 containing a covering layer preform 418 supplies the respective preform to the layering station 414, where the two preforms meet to make up a joint tape preform 420. The joint tape preform 420 passes through a bonding station 422, where the preforms are pressed together and, optionally, bonded, to create a tape 202 that is rolled into a joint tape roll 422. Additional optional operations such that the application of wall adhesive and release paper on the back of the tape may also be carried out but are not shown here for simplicity.

When assembling the tape 202, various considerations can be taken into account. For example, the joint tape preform 420 may be formed as a mat having a width equivalent to multiple joint tape widths, which is then cut into sections making up each desired joint tape roll package. Moreover, in one alternative embodiment, each of the substrate layer and covering layer preforms may be manufactured on demand, for example, by plastic extrusion of fibers, instead of being preformed into fibers that are then used to assemble the tape. The bonding station 422 may apply pressure and/or adhesive to bond the substrate and covering tape layers to one another in one step or in multiple steps. Alternatively, the bonding station may include a pool or vat of adhesive through which the tape passes so that adhesive collects at the fiber intersection sites and otherwise drains off the remaining tape structure. In embodiments where more than one fiber layer makes up the covering tape layer, as between the covering fiber layers, the fibers may be connected to each other using adhesive or may alternatively be tangled or woven to each other by mechanical means.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The following examples further illustrate the invention but, of course, should not be construed as in any way limiting its scope.

EXAMPLE 1

This Example illustrates the shear strength of conventional fiberglass tape containing additional rigid members, for example, metal reinforcements, which are found to enhanced rigidity in the transverse direction of a joint. Wallboard samples 1A and 1B were prepared by cutting 3" by 8" drywall panels and constructing a joint by aligning the long dimensions of the panels in an offset manner, overlapping by four inches.

A 50/50 mixture by mass of Hardman® Part A 8173 and Hardman® Part B 8173 adhesives was applied in a thin layer along the paper surface of the two panels' adjoining sides. Metal reinforcements were then equally spaced perpendicular to the joint and connected the two panels. The metal reinforcements were lightly pressed into the layer of adhesive and allowed to adhere to the board surface for 24 hours. A section of SHEETROCK® Fiberglass Drywall Tape was adhered directly to the metal reinforcements and board along the joint. A thin layer of joint compound (SHEETROCK® All-Purpose Joint Compound, Ready-Mixed) was applied over the adhered fiberglass mesh tape using 22-gauge guide bars placed three inches apart. The 22-gauge coat was allowed to dry for 24 hours, and the joint was filled using 16-guage guide bars to produce a 4" by 3" by 0.055" layer of joint compound.

All measurements were made on an ATS Model contained in a controlled temperature/humidity room held at 70° F./50% R.H. The prepared sample was then mounted in the test fixture and the test was performed in compression mode. Results for the shear strengths are provided below in Table 1, where "Fiberglass" tape denotes SHEETROCK® Fiberglass Drywall Tape that was installed using SHEETROCK® All-Purpose Joint Compound (Ready-Mixed) onto the samples, and "Paper" tape denotes SHEETROCK® Paper Tape that was installed using SHEETROCK® All-Purpose Joint Compound (Ready-Mixed).

TABLE 1

| Tape | Shear Strength (lbs) |
| --- | --- |
| Fiberglass* | 60 |
| Sample 1A | 123.7 |
| Sample 1B | 117.3 |
| Paper** | 122 |

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A joint tape for drywall, comprising:
a substrate layer having an elongate shape to form a substrate strip, the substrate layer extending in a lengthwise direction to define a length and extending in a transverse direction to define a width, the width being narrower than the length, the substrate layer strip being made from reinforced plastic, glass, fabric, or metal that is formed into substrate fibers that have a substrate layer strip flexibility in the lengthwise direction and also in the transverse direction that is perpendicular to the lengthwise direction; and
a covering layer having an elongate shape and disposed in overlapping and bonding relation on the substrate layer, the covering layer extending in the lengthwise direction and in the transverse direction to form a strip that matches and extends along the substrate layer strip, the covering layer strip being made from metal, plastic, or glass that is formed into covering fibers, the covering fibers having a covering layer strip flexibility in the transverse direction and configured to withstand compressive forces applied generally in the transverse direction and shear stresses applied generally long the transverse direction;
wherein the substrate fibers and the covering fibers contact each other at intersections, and wherein the joint tape further includes bonds disposed at a majority of intersections between the substrate fibers and the covering fibers:
wherein the covering layer strip flexibility is less than the substrate layer strip flexibility;
wherein the substrate fibers extend parallel to one another along the lengthwise direction;
wherein the covering fibers extend parallel to one another a long the transverse direction;
wherein the substrate fibers are thinner and more flexible than the covering fibers, which are thicker and more rigid to withstand compressive forces along the transverse direction.

2. The joint tape of claim 1, wherein the substrate layer is made entirely of substrate fibers extending parallel to one another along the lengthwise direction.

3. The joint tape of claim 1, wherein the covering layer is made entirely of covering fibers extending parallel to one another along the transverse direction.

4. The joint tape of claim 1, wherein the substrate fibers of the substrate layer and the covering fibers of the covering layer are made from different materials, and wherein the covering fibers are made from metal;
wherein the covering fibers have a greater diameter than the substrate fibers.

5. The joint tape of claim 1, wherein the substrate fibers are made of the same material as the covering fibers;
wherein the covering fibers have a greater diameter than the substrate fibers.

6. The joint tape of claim 1, wherein the bonds are formed by deposition of an adhesive material at the majority of intersections between the substrate fibers and the covering fibers.

7. The joint tape of claim 1, wherein the substrate fibers and the covering fibers are made from plastic, and wherein the bonds are formed by locally melting the substrate fibers and the covering fibers to fuse the plastic material at each intersection.

8. A drywall joint between two adjacent drywall panels, comprising:
a layer of joint compound disposed along generally abutting edges of the two adjacent drywall panels;
a joint tape embedded within the layer of joint compound, the joint tape comprising:
a substrate layer having an elongate shape to form a substrate strip, the substrate layer extending in a lengthwise direction along the generally abutting edges to define a length and extending in a transverse direction to define a width, the width being narrower than the length, the substrate layer being made from reinforced plastic, glass, fabric, or metal that is formed into substrate fibers that have a substrate fiber modulus of flexibility in the lengthwise direction and in a transverse direction, which is perpendicular to the lengthwise direction; and
a covering layer having an elongate shape and disposed in overlapping and bonding relation on the substrate layer, the covering layer having an elongate shape that matches the substrate layer, the covering layer being made from metal, plastic, or glass that is formed into covering fibers having a covering fiber modulus of flexibility that is less than the substrate fiber modulus of flexibility in the transverse direction, the covering fibers configured to withstand compressive forces applied generally in the transverse direction tending to push the two adjacent drywall panels towards each other, and shear stresses applied generally along the transverse direction tending to slide the two drywall panels relative to one another along the abutting edges thereof;
wherein the substrate fibers and the covering fibers contact each other at intersections, and wherein the joint tape further includes bonds disposed at a majority of intersections between the substrate fibers and the covering fibers;
wherein the substrate fibers extend parallel to one another along the lengthwise direction;
wherein the covering fibers extend parallel to one another along the transverse direction;
wherein the substrate fibers are thinner and more flexible than the covering fibers, which are thicker and more rigid to withstand compressive forces along the transverse direction.

9. The drywall joint of claim 8, wherein the substrate layer is made entirely of substrate fibers extending parallel to one another along the lengthwise direction.

10. The drywall joint of claim 8, wherein the covering layer is made entirely of covering fibers parallel to one another along the transverse direction.

11. The drywall joint of claim 8, wherein the substrate fibers of the substrate layer and the covering fibers of the covering layer are made from different materials; and wherein the covering fibers are made metal;
wherein the covering fibers have a greater diameter than the substrate fibers.

12. The drywall joint of claim 8, wherein the substrate fibers are made of the same material as the covering fibers;
wherein the covering fibers have a greater diameter than the substrate fibers.

13. The drywall joint of claim 8, wherein the bonds are formed by deposition of an adhesive material at the majority of intersections between the substrate fibers and the covering fibers.

14. The drywall joint of claim 8, wherein the substrate fibers and the covering fibers are made from plastic, and wherein the bonds are formed by locally melting the substrate fibers and the covering fibers to fuse the plastic material at each intersection.

15. A method for manufacturing joint tape for use in drywall joints, comprising:
providing a substrate layer that is made from reinforced plastic, glass, fabric, or metal that is formed into substrate fibers that have a substrate layer bending modulus in a lengthwise direction and in a transverse direction, the transverse direction being perpendicular to the lengthwise direction;
providing a covering layer that is made from metal, plastic, or glass that is formed into covering fibers, the covering fibers having a covering layer bending modulus that is different than the substrate layer bending modulus such that the covering layer is more rigid in the transverse direction than the substrate layer, wherein the substrate layer includes the substrate fibers extending parallel to one another along the lengthwise direction, wherein the covering layer includes the covering fibers extending parallel to one another along the transverse direction, wherein the substrate fibers are thinner and more flexible than the covering fibers, which are thicker and more rigid to withstand compressive forces along the transverse direction;
depositing the substrate and covering layers in overlapping relation to create a joint tape preform, wherein the substrate fibers and the covering fibers contact each other at intersections; and
bonding the substrate layer to the covering layer in the joint tape preform to create a joint tape that is more rigid in the transverse direction than the lengthwise direction, wherein bonding the substrate layer to the covering layer includes forming bonds at a majority of intersections between the substrate fibers and the covering fibers.

16. The method of claim 15, wherein forming the bonds is accomplished by locally melting the covering fibers and the substrate fibers at the intersections to fuse them together.

* * * * *